Patented Mar. 25, 1941

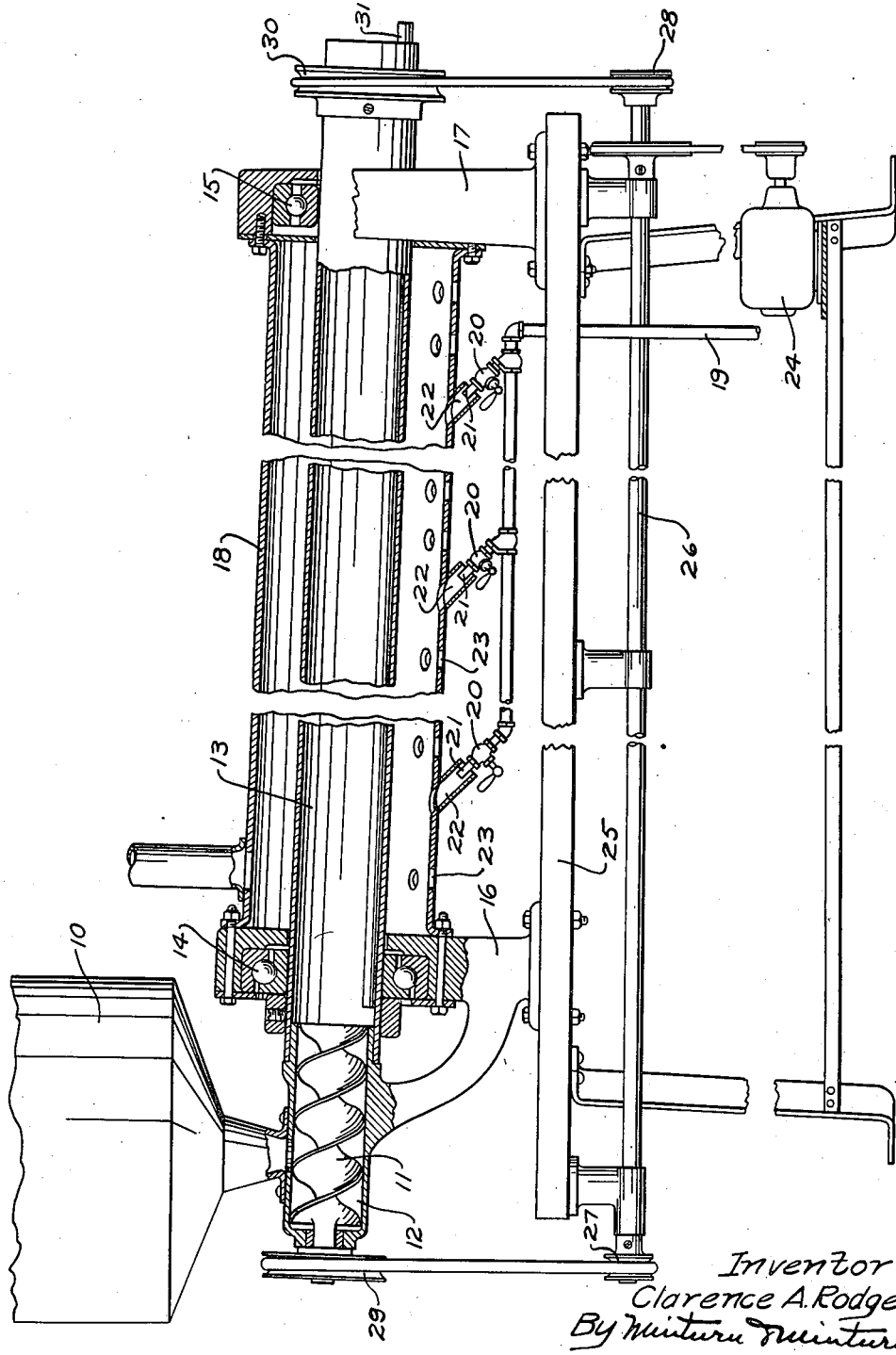

2,236,220

UNITED STATES PATENT OFFICE 2,236,220

PROCESS AND MACHINE FOR PREPARING BATTERY PLATE BINDERS

Clarence A. Rodgers, Indianapolis, Ind.

Application March 8, 1939, Serial No. 260,558

1 Claim. (Cl. 23—146)

This invention relates to means for preparing a secondary battery plate binding material. One of the great difficulties encountered in the operation of secondary or storage batteries is that the material employed in the positive plate drops out and settles in the bottom of the battery so as to become unusable. The rate of loss of this material generally determines the length of life of the battery.

This particular invention relates entirely to the means for producing a material to serve as a binding medium for retaining the active material in the positive plates over extremely long periods of time. Reference is made to my co-pending application for U. S. Letters Patent, Serial No. 260,557, filed March 8, 1939, for Battery plate binder.

A primary object of this invention is not only to produce a highly desirable binding material as above indicated but also to produce that material in the most economically possible manner. With this in mind, materials taken from used batteries are employed to make new plates, and an important advantage of the present invention is that these materials may be converted into the form desired with a minimum of handling and with a certainty of final form upon leaving the machine carrying out the process.

To begin with, positive plates of the old batteries are initially dried. The dried plates are placed in a tumbling machine of the usual and well known construction and these plates are tumbled until the formerly pasted material is broken loose and reduced to a rather fine powder. This material consists mainly of lead peroxide ($PbO_2$) and lead sulphate ($PbSO_4$). The lead of the plate grids is separated from the powder.

This powdered mixture is then ready to travel through the machine as illustrated in the accompanying drawing, in which The single view is a side elevation in partial section of one form of machine suitable for carrying out the process.

The powder material referred to is placed in the hopper 10 from the bottom of which it is conveyed laterally by any suitable conveyor, herein shown as a screw 11 operating within a tubular chamber 12. The screw 11 discharges the material into a steel tube 13. This steel tube 13 is relatively of small diameter and is mounted to be rotatable about its axis between any suitable bearings, herein shown as the ball bearings 14 and 15 carried in standards 16 and 17. The tube 13 telescopes over the discharge end of the chamber 12 so as to prevent loss of material at the juncture of these two members.

The tube 13 is mounted to have its receiving end at the end of the screw 11 to be at a higher elevation than its discharging end. It is desired to apply heat to the tube 13 externally thereof and for this purpose the tube 13 is carried through a tubular tunnel 18 which, in the present form, is a tubular member axially aligned with the tube 13 and having its enclosing wall spaced from the tube. This enclosing tube 18 is mounted to be stationary and is herein shown as being secured in place by being attached to both standards 16 and 17.

In the present form of the invention, the heating means shown consists of a plurality of gas burners. A gas supply pipe 19 is provided with an outlet for each burner, each outlet being through a control valve 20, herein shown as three in number, and a nozzle 21 leads from each valve into the open end of a short tube 22 discharging angularly through the wall of the housing tube 18 in a direction toward the higher elevation of the tube 13. The direction of discharge is also toward the axis of the tube 13. Around this opening into which the nozzle 21 extends, additional air holes 23 are preferably provided in order to sustain combustion most efficiently of the gases supplied by the pipe 19.

The screw 11 and the tube 13 are turned by any suitable power means, herein shown as by an electric motor 24 mounted upon the base of a stand 25 which carries the supporting standards 16 and 17. The motor 24 drives a counter-shaft 26 which in turn is belted through pulleys 27 and 28 at its respective ends to the pulleys 29 for the screw 11, and 30 on the tube 13 to drive those respective elements. The length and diameter of the tube 13 will vary in accordance with the rate of feed of the material from the screw 11 into the tube and the speed of turning of the tube 13.

In one particular small installation, I employ a steel tube 13 of about one and one-eighth inches diameter and about four feet long and turn this tube at a speed of about sixty revolutions per minute. This, however, gives a relatively small rate of production and the size of the tube will either have to be increased or additional machines would be used. Preferably additional machines would be employed rather than increasing the size.

In operating the machine, the material coming into the tube 13 from the screw 11 will, of course, slowly work longitudinally through the tube by reason of the inclination thereof and the resultant material will eventually be discharged from the open end of the tube. The tube 13 is heated to a temperature of around seven or eight hundred degrees Fahrenheit or at least to a sufficiently high temperature wherein oxygen being liberated from materials going through the tube will combine to some extent at least with the iron of the tube wall to form an iron oxide.

What is considered to take place as the finely divided material travels down through the heated tube 13 is that the lead peroxide will give up oxygen and leave lead monoxide or litharge (PbO) by reason of the high degree of heat applied and this liberated oxygen will combine with the heated iron of the steel tube to form an oxide such as ferric oxide ($FeO_2$). This action is facilitated by the rotation of the tube 13 which cascades the material by constantly lifting it therein upwardly on one side of the tube to a point where the material will flow back downwardly over itself toward to bottom of the tube, thus exposing great areas of the particles of the material constantly to the heated atmosphere and at the same time setting up to some degree a wiping action along the inner face of the tube. The length of time the material remains within the tube 13 is not critical, but the above indicated proportions with speed of rotation will give an approximate idea of the speed at which the material may be moved satisfactorily.

The resultant mixture of lead oxide and iron oxide drops from the lower discharge end of the tube 13. Of course, there will be other materials within this mixture such as the lead sulphate, lead, and some antimony coming from the original plate grids. The particular handling of this material from this point on does not enter into this invention, and is the subject matter of the co-pending application above referred to.

A round iron bar 31 is inserted into the tube 13 and allowed to rest therein loosely. As the tube 13 turns the bar 31 will be turned over and over tending to reduce the mixture to finer particles, to aid in exposing more particle areas to the heated atmosphere; and further to press those particles against the tube wall for quicker heat transfer and oxygen liberation in contact therewith.

While I have herein shown and described my invention in the one particular form, it is obvious that structural changes may be employed without departing from the spirit of the invention and I, therefore, do not desire to be limited to that precise form beyond the limitations as may be imposed by the following claim.

I claim:

That method of preparing a binder for battery plate compositions which consists of drying used positive plates, tumbling the dried plates to separate the plate filler from the plate grids and reduce it to a powder, and heating the powder in the presence of iron by cascading it in a tube comprising iron in its composition, heated to a temperature ranging about 700 to 800 degrees Fahrenheit.

CLARENCE A. RODGERS